United States Patent [19]
Astarabadi

[11] Patent Number: 5,822,405
[45] Date of Patent: Oct. 13, 1998

[54] AUTOMATED RETRIEVAL OF VOICE MAIL USING SPEECH RECOGNITION

[75] Inventor: Shaun Astarabadi, Irvine, Calif.

[73] Assignee: Toshiba America Information Systems, Inc., Irvine, Calif.

[21] Appl. No.: 710,366

[22] Filed: Sep. 16, 1996

[51] Int. Cl.$^6$ ........................................... H04M 1/64
[52] U.S. Cl. ................. 379/88; 379/93.24; 379/352
[58] Field of Search .................... 379/67, 88, 89, 379/92.01, 92.03, 92.04, 93.24, 352

[56] References Cited

U.S. PATENT DOCUMENTS

| | | | |
|---|---|---|---|
| 4,837,798 | 6/1989 | Cohen et al. | 379/88 |
| 4,972,457 | 11/1990 | O'Sullivan | 379/59 |
| 4,996,707 | 2/1991 | O'Malley et al. | 379/100 |
| 5,003,575 | 3/1991 | Chamberlin et al. | 379/89 |
| 5,327,486 | 7/1994 | Wolff et al. | 379/96 |
| 5,335,276 | 8/1994 | Thompson et al. | 380/21 |
| 5,349,636 | 9/1994 | Irribarren | 379/89 |
| 5,444,768 | 8/1995 | Lemaire et al. | 379/68 |
| 5,452,289 | 9/1995 | Sharma et al. | 370/32.1 |
| 5,452,356 | 9/1995 | Albert | 380/9 |
| 5,646,981 | 7/1997 | Klein | 379/93.24 |
| 5,675,507 | 10/1997 | Bobo, III | 379/100.01 |

*Primary Examiner*—Fan S. Tsang
*Attorney, Agent, or Firm*—Steven C. Sereboff; Sereboff & Buyan, LLP

[57] ABSTRACT

In accordance with the invention, a traveler can use a portable computer to automatically retrieve voice mail from a PBX-based voice mail system or a telephone answering machine. The computer has a modem, an audio output system (e.g., SoundBlaster card and speakers) and a special program. During a training phase of the method, the program creates a script of normal interaction with the voice mail system. The script is used during a message retrieval phase to retrieve voice mail messages. Multiple scripts may be recorded. During the retrieval phase of the method, the program uses word spotting to compare prompts received from the voice mail system to prompts in the script to ensure that the process is working properly. The program can create script commands for: dialing the voice mail system; entering a mail box number and password; making appropriate selections to listen to new messages; recording the messages from the voice mail system into the portable computer; and disconnecting from the voice mail system.

46 Claims, 5 Drawing Sheets

AUTOMATED RETRIEVAL OF VOICE MAIL USING SPEECH RECOGNITION

BACKGROUND OF THE INVENTION

1. Field of the Invention

The present invention relates generally to devices for automated retrieval of voice mail using speech recognition.

2. Description of Related Art

The modern electronic office represents a substantial increase in the productivity and accuracy with which documents and audio messages may be processed. Whether functioning on site at a business location, or in a private home, the contemporary electronic office permits a single user to process large amounts of information and rapidly and efficiently direct that information, utilizing computer and telephone networks, to other users who may be located thousands of miles distant. However, this increase in efficiency carries with it a certain lack of flexibility in that a user must typically be in his or her office, at the desk, logged into a computer or dialed into and interacting with the telephone system, in order to accomplish this work.

This is not always possible, or even desirable. The business traveler, for example, due to considerations of convenience, necessity, or privacy, may wish to access, retrieve and store telephone messages at one point in time and listen to them at a later, more convenient time.

Telephone messages stored within a voice mail system do not generally require real time response. That is, a user is generally free to ignore such messages until a convenient time is found to listen to them. Thereafter, the user takes notes as to who called and the reason for the call and discards the voice mail message. Some voice mail systems allow the user who has listened to a message to record a voice response, which is then automatically returned to the caller who left the message. Other voice mail systems require the user to dial the number of each caller in order to return a message. Existing phone mail systems require a user to be connected to the telephone system and listening, for the entire duration of any recorded message, in order to process voice mail messages.

Personal phone message recording machines are also known, many of which include removable audio tapes. A user may extract a tape with recorded phone messages and place that tape in a portable tape player in order to achieve some measure of mobility while listening to and processing such audio messages. However, the user must actually go to the physical location of the telephone recording machine in order to remove the tape. Further, if the user wishes to record a verbal response, he or she must use a second, portable tape recording machine. Even while utilizing this additional, portable tape recording machine the user lacks a method whereby the response may be electronically delivered to its logical destination, that is the voice mail of the original sender.

Verbal communication is enhanced somewhat by the utilization of cordless telephones, since such devices permit the user to wander within a moderate distance of a base phone without requiring a telephone cable. Additionally, cellular and PCS phones have greatly increased this range, but such systems are costly to purchase and use and are sometimes heavy and awkward to transport. In either event, both of these telephone technologies still require a connection (albeit by radio) to the telephone system for the entire duration of message processing.

Modern computer systems permit the so-called 'telecommuter' to extend the virtual office by connecting home computers to a central computer system by utilizing telephone lines or other telecommunication means. It is also possible to work with stand-alone computers, transferring the work accomplished at such a computer when it is reconnected to the main system. This stand-alone mode of operation is generally used with a portable computer, giving the computer user a great degree of mobility.

Industry recognition of the fact that keyboards and display screens cannot possibly achieve a sufficiently small size while remaining utilitarian has lead to the development of digital organizers and, recently, a 'palm top' computer which typically utilizes an icon based user interface with a pointing device, such as a pen. These devices have no keyboard and no provision for attaching a keyboard. The primary input to such devices is through character recognition and a pointing device. While these devices can generally recognize printed letters, they are currently difficult to 'train' and therefore prone to errors. Furthermore, data can easily be lost since easy-to-use back-up options are not presently available. Thus, to date, these devices do not appear to be achieving universal acceptance. Nonetheless, such devices, if equipped with the necessary components, could also serve to practically interface with voice mail systems by the device and method of this invention.

Increasingly, a single individual will wish to access more than one system which may hold messages for that individual. Thus, for example, and employee who is away from his or her own office may wish to access an answering machine at home and a voice mail system at work. As these systems become cheaper and more commonplace the same individual may also wish to access other voice mail systems, such as may belong to community or religious groups, which may use entirely different protocols than the voice mail system used at work.

Although it is possible for one computer system to interact with another via remote communication, it does so, typically, via computer communication programs. Typical computer communications programs all allow a user to record, edit and replay scripts. However, these scripts are limited to computer to computer communications, and are not believed to be able to retrieve voice mail in the manner described hereinafter. Nor are they able to interact with simple answering machines.

It is therefore a first object of the invention to provide a device which can easily, inexpensively and efficiently retrieve voice mail from one or more remote message facilities.

It is a further object of the invention to provide a device which can obtain messages from one of more remote message facilities, storing them for later handling.

It is another object of the invention to provide a device which can be easily trained in a minimal number of sessions to retrieve and store messages from one or more remote message facilities.

It is yet a further object of the invention to provide a device which can recognize and handle unexpected announcements relayed by a remote message facility.

It is yet another object of the invention to provide a device which can interact independently with a variety of different voice message facilities.

It is still another object of the invention to provide a method for training a program stored in a portable computer to interact with a remote message facility, retrieving and storing messages obtained therefrom.

These objects and others are provided by the device for, method of and system for automated retrieval of voice mail using speech recognition of the present invention.

SUMMARY OF THE INVENTION

In accordance with the invention, a computer device is used to automatically retrieve voice messages from a voice mail system. The computer device has a modem, an audio processing system and a special program. During a training phase of the method of the invention, a script of normal interaction with the voice mail system is created. The script is used during an automatic message retrieval phase to retrieve messages. Multiple scripts may be recorded. During the automatic message retrieval phase of the method, the program uses word spotting to compare announcement received from the voice mail system to announcements in the script to ensure that the process is working properly. A computer device for accessing and processing at least one audio message from a first remote message facility accessible via telephone, where the first remote message facility provides verbal announcements, the computer device has a processor, a memory coupled to the processor for storing a program, verbal announcement audio signals, and input message signals, a telephone interface coupled to the microprocessor for selectively and temporarily interconnecting the computer device with a telephone network, an audio input subsystem coupled to the processor for accepting the verbal announcement audio signals and the input message signals, audio output subsystem coupled to the processor for outputting stored input message signals, a signal producing device for producing signals recognizable by the first remote message facility, and a stored program resident in the memory, the program has a verbal announcement accepting function for accepting verbal announcements from the first remote message facility, a verbal announcement recording function for recording verbal announcements from the first remote message facility, a verbal announcement discriminating function for discriminating between different verbal announcements from the first remote message facility, and a response function for responding to verbal announcements from the first remote message facility.

According to an aspect of the invention the computer device is a portable computer and the processor is a microprocessor.

According to another aspect of the invention the input message signals are audible speech signals.

According to yet another aspect of the invention the further including an analog-to-digital converter coupled to the communications means for converting audible speech messages transferred from the first remote message facility into digital data format prior to storage within the memory.

According to still another aspect of the invention the further including headphones for monitoring verbal announcement signals input to the sound board.

A further aspect of the invention the verbal announcement discriminating function also has a spotting function for spotting a word or phrase within a continuous flow of speech.

Preferably the response function outputs speech signals.

According to an aspect of the invention the computer device also provides functions to process at least one audio message from a second remote message facility, where the second remote message facility provides different verbal announcements from the first remote message facility.

According to another aspect of the invention the computer device automatically accesses the second remote message facility upon recognizing an error condition affecting its access to the first remote message facility.

A portable computer device for accessing and processing audio messages stored at a first remote message facility accessible via telephone, where the first remote message facility provides verbal announcements, the portable computer device has a microprocessor, memory coupled to the microprocessor for storing a program and audio signals, a telephone interface coupled to the microprocessor for selectively and temporarily interconnecting the portable computer device with a telephone network, a sound board coupled to the microprocessor for accepting audio signals, audio output coupled to the microprocessor for outputting audible speech from stored audio signals, a signal producing device for producing signals recognizable by the first remote message facility, and a stored program resident in memory, the program has a verbal announcement accepting function for accepting verbal announcements from the first remote message facility, a verbal announcement recording function for recording verbal announcements from the first remote message facility, a verbal announcement discriminating function for recognizing verbal announcements from the first remote message facility, an output control function for allowing a user to control a message playback with respect to identity of message and speed of playback, and a response function for responding to verbal announcements from the first remote message facility.

According to yet another aspect of the invention the audio signals stored within the memory are stored in digital data format and wherein the audio output includes digital data-to-speech conversion means coupled to the processor for creating speech signals corresponding to digital data.

According to still another aspect of the invention the further including analog storage means and wherein a set of the audio signals stored within the memory are stored in analog data format.

In a further aspect of the invention there is an analog-to-digital converter coupled to the sound board for converting audio messages transferred from the first remote message facility into digital data format prior to storage within the memory.

Preferably the further including a status indicator coupled to the microprocessor for visually indicating communication between the first remote message facility and the portable computer device.

According to an aspect of the invention the response function outputs DTMF signals.

According to another aspect of the invention the response function outputs speech signals.

According to yet another aspect of the invention the computer device also functions to access and process at least one audio message from a second remote message facility, where the second remote message facility provides different verbal announcements from the first remote message facility.

According to still another aspect of the invention the computer device automatically accesses the second remote message facility upon recognizing an error condition affecting its access to the first remote message facility.

According to a further aspect of the invention, the computer device accesses and processes audio messages stored at more than one remote message facility accessible via telephone, where each remote message facility provides verbal announcements, the portable computer device has a processor, memory coupled to the processor for storing a program and audio signals, a telephone interface coupled to the processor for interconnecting the portable computer device with a telephone network, a sound board coupled to the processor for accepting audio signals, audio output coupled to the processor for outputting audible speech from stored audio signals, a signal producing device for producing signals recognizable by each remote message facility, and a stored program resident in memory, the program has a verbal announcement accepting function for accepting verbal announcements from each remote message facility, a verbal announcement recording function for recording verbal announcements from each remote message facility, a verbal announcement discriminating function for recognizing verbal announcements from each remote message facility, and a response function for responding appropriately to verbal announcements from remote message facility.

In a further aspect of the invention the computer is a portable computer and the processor is a microprocessor.

Preferably a first remote message facility is a voice mail facility and a second remote message facility is an answering machine.

According to an aspect of the invention the stored program also has an output control function for allowing a user to control a message playback as to identity of message and speed of playback.

In another aspect of the invention, a storage medium has a computer program stored thereon, the program has instructions for retrieving messages from a first remote audio message facility by connecting a computer containing the storage medium, via a telephone line, to the first remote message facility, accepting a first voice greeting announcement from the first remote message facility to the computer, comparing in the computer the first voice greeting announcement with a second voice greeting announcement previously stored in the computer, if the first voice greeting announcement conforms with the second voice greeting announcement, then receiving a first voice status announcement by the computer from the first remote message facility, wherein the first voice status announcement indicates that the first remote message facility has unread messages, comparing in the computer the first voice status announcement with a second voice status announcement previously stored in the computer, if the first voice status announcement conforms with the second voice status announcement, then accepting from the first remote message facility to the computer unread messages, and saving the unread messages on the computer.

In accordance with still another aspect of the invention, a storage medium has a computer program stored thereon, the program has instructions for retrieving messages from a first remote audio message facility.

According to another aspect of the invention the storage medium has further instructions for accepting a mailbox identification request announcement from the first remote audio message facility, and transmitting a mailbox identification number, previously stored in the computer, from the computer to the first remote message facility.

In yet another aspect of the invention, the storage medium has a computer program stored thereon, the program has instructions for retrieving messages from a first remote audio message facility.

According to yet another aspect of the invention the storage medium has further instructions for awaiting comparison in the first remote message facility the mailbox identification number with an authorized mailbox number previously stored in the first remote message facility, if the mailbox identification number matches the authorized mailbox number, then transmitting a first password, previously stored in the computer, from the computer to the first remote message facility.

In still another aspect of the invention, a computer device for accessing and processing at least one audio message from a first remote message facility accessible via telephone, where the first remote message facility provides verbal announcements, the computer device has a processor, memory coupled to the processor for storing a program, verbal announcement audio signals, and input message signals, a telephone interface coupled to the microprocessor for selectively and temporarily interconnecting the computer device with a telephone network, a sound board coupled to the processor for accepting the verbal announcement audio signals and the input message signals, audio output coupled to the processor for outputting stored input message signals, a signal producing device for producing signals recognizable by the first remote message facility, and a stored program resident in the memory, the program performing the steps of (1) connecting a computer containing the computer program, via a telephone line, to the first remote message facility, (2) accepting a first voice greeting announcement from the first remote message facility to the computer, (3) comparing in the computer the first voice greeting announcement with a second voice greeting announcement previously stored in the computer, if the first voice greeting announcement conforms with the second voice greeting announcement, then (a) receiving a first voice status announcement by the computer from the first remote message facility, wherein the first voice status announcement indicates that the first remote message facility has unread messages, (b) comparing in the computer the first voice status announcement with a second voice status announcement previously stored in the computer, if the first voice status announcement conforms with the second voice status announcement, then (i) accepting from the first remote message facility to the computer a first set of unread messages, and (ii) saving the first set of unread messages on the computer.

According to still another aspect of the invention the stored program performs the farther steps of accepting a mailbox identification request announcement from the first remote audio message facility, and transmitting a mailbox identification number, previously stored in the computer, from the computer to the first remote message facility.

In accordance with a further aspect of the invention, the stored program performs the further steps of awaiting comparison in the first remote message facility the mailbox identification number with an authorized mailbox number previously stored in the first remote message facility, if the mailbox identification number matches the authorized mailbox number, then transmitting a first password, previously stored in the computer, from the computer to the first remote message facility.

In accordance with still another aspect of the invention, wherein the computer device also functions to access and process at least one audio message from a second remote massage facility and the stored program resident in memory performs the additional steps of (4) connecting a computer containing the computer program, via a telephone line, to the second remote message facility, (5) accepting a third voice greeting announcement from the second remote message facility to the computer, (6) comparing in the computer the third voice greeting announcement with a fourth voice greeting announcement previously stored in the computer, if the third voice greeting announcement conforms with the fourth voice greeting announcement, then (a) accepting from the first remote message facility, to the computer, a first set of unread messages, and (b) saving the first set of unread messages on the computer.

According to an aspect of the invention the stored program resident in memory performs the additional step of determining if there is an error condition with respect to the first remote message facility and, if there is an error condition with respect to the first message facility, then (a) disconnecting from the first remote message facility, and (b) proceeding to establish a connection with the second remote message facility.

In accordance with a further aspect of the invention, the invention provides method of retrieving messages from a remote audio message facility where the remote audio message facility provides verbal announcements by connecting a computer via a telephone to the remote message facility, accepting a first voice greeting announcement, previously stored in the remote message facility, from the remote message facility to the computer, comparing in the computer the first greeting announcement with a second voice greeting announcement previously stored in the computer, if the first greeting announcement conforms with the second greeting announcement, then transmitting a first password, previously stored in the computer, from the computer to the remote message facility, comparing in the remote message facility the first password with a second password previously stored in the remote message facility, if the first password matches the second password, then receiving a first voice status announcement in the computer from the remote message facility, wherein the first voice status announcement indicates that the remote message facility has unread messages, comparing in the computer the first voice status announcement with a second voice status announcement previously stored in the computer, if the first voice status announcement conforms with the second voice status announcement, then accepting transfer, from the remote message facility to the computer, of the unread messages.

According to another aspect of the invention the step of accepting transfer from the remote message facility to the computer of the unread messages is performed by transmitting an unread message from the remote message facility to the computer, identifying in the computer the end of transmission of the unread message, transmitting a third voice status announcement, previously stored in the remote message facility, from the remote message facility to the computer, comparing in the computer the third voice status announcement with a fourth voice status announcement previously stored in the personal computer, the fourth voice status announcement indicative that the remote message facility has additional unread messages, if the third voice status announcement conforms with the fourth voice status announcement, then returning to step (a) above.

According to yet another aspect of the invention the step of accepting transfer from the remote message facility to the computer of the unread messages is performed by transmitting an unread message from the remote message facility to the computer, identifying in the computer the end of transmission of the unread message, transmitting a current DTMF signal, previously stored in the remote message facility, from the remote message facility to the computer, comparing in the computer the current DTMF signal with a previously stored DTMF signal in the personal computer, the stored DTMF signal indicative that the remote message facility has additional unread messages, if the current DTMF signal conforms with the stored DTMF signal, then returning to step (a) above.

According to another aspect of this invention, the invention provides means of retrieving at least one audio message from a remote audio message facility accessible via telephone, where the remote message facility provides verbal announcements, the (1) connecting a computer containing the computer program, via a telephone line, to the remote message facility, (2) accepting a first voice greeting announcement from the remote message facility to the computer, (3) comparing in the computer the first voice greeting announcement with a second voice greeting announcement previously stored in the computer, if the first voice greeting announcement conforms with the second voice greeting announcement, then (a) receiving a first voice status announcement by the computer from the remote message facility, wherein the first voice status announcement indicates that the remote message facility has unread messages, (b) comparing in the computer the first voice status announcement with a second voice status announcement previously stored in the computer, if the first voice status announcement conforms with the second voice status announcement, then (i) accepting from the remote message facility to the computer unread messages, and (ii) saving the unread messages on the computer.

In according with a further aspect of the invention, a computer device for processing verbal communications obtained from interaction with a first remote facility accessible via telephone, has a processor means, a data input means for interacting with the processor means, a display means for providing output to a user, a communication input means for sampling verbal communications from the first remote facility, a memory means coupled to the processor means for storing a plurality of messages, a telephone interface means coupled to the processor for interconnecting the computer device with a telephone network, communications means coupled to the processor means for transferring at least one audio input from the first remote message facility to the memory in response to establishing communication between the first remote message facility and the computer device, first comparison means for comparing a first announcement received from the first remote message facility with a second announcement received from the first remote message facility and stored in the memory to determine if the first announcement matches the second announcement, and first control means for actuating receipt and transfer of an audio message from the first remote facility to the memory when the first announcement matches the second announcement.

According to still another aspect of the invention the which further includes audio output means for creating audible speech from an audio message stored in the computer memory.

In a further aspect of the invention the further including an analog-to-digital converter coupled to the communications means for converting audio messages transferred from the first remote facility into digital data format prior to storage within the memory means.

In accordance with another aspect of the invention, preferably the first remote facility is a voice mail facility containing stored audio messages.

According to an aspect of the invention there is also for processing verbal communications from interaction with a second remote facility accessible via telephone, and has second comparison means for comparing a third announcement received from the second remote message facility with a fourth announcement received from the second remote message facility and stored in the memory to determine if the third announcement matches the fourth announcement, and second control means for actuating receipt and transfer of an audio message from the second remote facility to the memory when the third announcement matches the fourth announcement.

According to another aspect of the invention there is a computer device for processing verbal communications obtained from interaction with a first remote facility and a second remote facility, each accessible via telephone having recognition means for recognizing an error condition with respect to the first remote facility, and error handling means for terminating connection with the first remote facility and instituting connection with the second remote facility in the event of an error condition with respect to the first remote facility.

According to yet another aspect of the invention the first remote facility is a voice mail facility capable of containing stored audio messages and the second remote facility is an answering machine.

In accordance with another aspect of the invention, the invention provides of training a computer program to provide automatic verbal communications with a remote message facility where the remote message facility provides verbal announcements which is performed by running an access program on a personal computer, connecting the computer running the access program to the remote message facility, setting up a user interface to allow interaction of a user with the remote facility, navigating a verbal communication accessing session with respect to the remote facility by allowing the user to perceive communications from the remote facility, allowing the user to transmit input to the remote facility, capturing the communications from the remote facility, and capturing the user input, and processing the communications from the remote facility to produce recognition contexts.

According to still another aspect of the invention the remote facility is a voice mail facility.

In a further aspect of the invention the remote facility is an answering machine.

In another aspect of the invention, preferably the user input is in the form of DTMF.

According to an aspect of the invention the user input is verbal.

According to another aspect of the invention the where the communications from the remote facility are captured as sound waves linked to corresponding user input.

According to yet another aspect of the invention the step of processing communications from the remote facility is further broken down into the steps of converting the wave records to wave format files, pre-processing the wave format files, editing the pre-processed wave format files with a utility program, and evaluating the edited wave format files with an automatic speech recognition evaluator.

According to still another aspect of the invention the computer device also functions to access and process at least one audio message from a second remote message facility, where the second remote message facility is an answering machine.

DESCRIPTION OF THE DRAWINGS

These and other advantages of the present invention are best understood with reference to the drawings, in which, in varying detail.

These and additional embodiments of the invention may now be better understood by turning to the following detailed description wherein an illustrated embodiment is described.

DETAILED DESCRIPTION OF THE INVENTION

Throughout this description, the preferred embodiment and examples shown should be considered as exemplars, rather than limitations on the apparatus and methods of the present invention.

Figure 1:
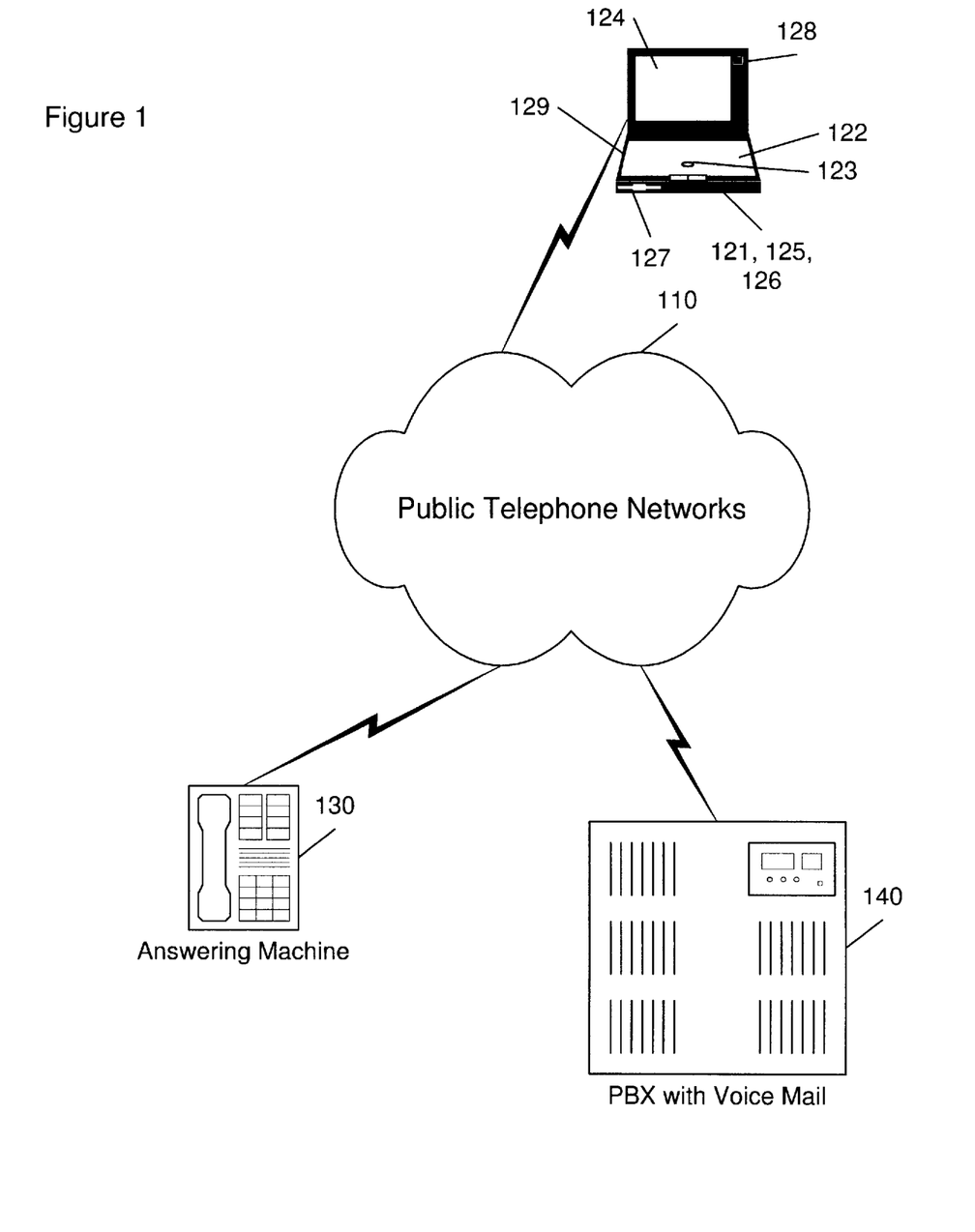
FIG. 1 is a block diagram of devices for use in conjunction with the system and method of the invention.

Referring now to FIG. 1, there is shown a block diagram of devices for use in conjunction with the system and method of the invention. These devices include a portable computer 120, an answering machine 130 and a PBX with voice mail 140. The preferred personal computer is a notebook PC running Windows95 (Microsoft Corporation, Redmond, Wash.).

The portable computer 120 maybe any one from a class of devices which are portable and relatively light and have a processor 121, a data input device, a display and memory for data and program storage. Such a device may be a notebook PC, a palmtop PC, a personal digital assistant or single purpose computer. The processor is exemplified by a CISC or RISC microprocessor such as the Intel Corporation (Santa Clara, Calif.) Pentium and Digital Equipment Corporation (Maynard, Mass.) Alpha. The data input device is exemplified by a keyboard 122, mouse 123, trackball or pen. The display is exemplified by an LCD 124 or CRT. The memory is exemplified by a hard drive 125, SIMMs, DIMMS 126, an optical drive or a floppy drive 127. The memory is coupled to the processor 121 for storing programs, announcements, scripts, messages, etc. It is also possible to provide an ancillary analog recording device, such as a tape recorder (not shown), to store messages in an analog format. The portable computer 120 also preferably includes a voice capable modem 129 or other means of interfacing selectively and temporarily with the telephone network 110 as well as recording a voice from a telephonic connection.

The portable computer 120 also preferably includes a sound board such as SoundBlaster sound board from Creative Labs, or an equivalent which has an audio input subsystem for processing audio inputs and an audio output subsystem for processing audio outputs. The audio input subsystem preferably includes an analog-to-digital converter which converts the analog audio signals accepted by the device to digital signals for ease of storage. The audio output subsystem preferably includes a digital-to-analog converter which converts stored digital signals into analog audio signals for playback over earphones or a speaker 128.

The portable computer 120 also preferably includes one or more programs for controlling the interaction of the components of the portable computer 120 and how the portable computer interacts with the user, the telephone network 110, the answering machine 130 and the PBX 140.

The answering machine 130 may be any one from a class of well know devices which are relatively inexpensive and are used in homes and small businesses for recording telephone messages. Typical answering machines can answer one or two lines, although larger capacity answering machines are known. Typical answering machines have a single out going message (OGM), and can store a number of in coming messages (ICMs). However, some answering machines provide a number of 'mail boxes.'

The PBX 140 may be any of a class of well known devices which are relatively expensive and are used in large organizations for recording telephone messages.

For both PBX-based voice mail systems and answering machines with mail boxes, a general OGM or verbal announcement is used to greet the caller and solicit a mail box number (or telephone extension). After the caller enters a mail box number, such a system typically plays a special OGM for that mail box and allows the caller to record an ICM. The recorded ICM is grouped with other ICMs for the same mail box and are retrievable as a group.

In accordance with the invention, the portable computer 120 is used to access a voice mail systems such as the answering machine 130 and/or the PBX 140 and retrieve messages stored by them. The portable computer 120 accesses these devices 130, 140 through a telephone network 110 which is preferably the public telephone network, setting up a stable, but temporary telephone interface and accepting and interpreting the OGMs. The invention is useful also for retrieving messages from devices 130, 140 on a private telephone network.

For the sake of simplicity, the following discussion describes how the personal computer 120, using the software, hardware and method of this invention, automatically retrieves voice mail from a generic voice mail system. The software, hardware, methods and systems described apply to automatic retrieval of voice mail from a PBX or an answering machine, even an answering machine with only a single mail box.

Hereinafter, OGMs, verbal announcements and other audio prompts by a voice mail system will be referred to as "announcements." Messages stored in a voice mail system for a user will be referred to herein as "messages." Some voice mail systems use tones and the user's own speech for navigation. Thus, "actions" by the user may include the following: wait for silence, recognize a voice prompt, recognize a tone indicator, wait for a certain period of time, depress touch tone (DTMF) keys, and recite a short phrase. A "context" is recognition expectations (e.g., a list of key words and phrases) within a particular stage or time frame during navigation of a voice mail system.

The Training Phase of the Method of the Invention

The method of the invention comprises two parts: a training phase and an automatic message retrieval phase. In the training phase, a program in the portable computer 120, referred to herein as "the capture program" records a script of the announcements and actions taking place when a user accesses a voice mail system. During script recording, the capture program preferably displays appropriate prompts, and provide a number of check boxes so that the user can indicate the appropriate action to be taken. The capture program may also provide other controls to allow the user to indicate how the voice mail system is to be navigated.

After the script is recorded, the user reviews it, identifying key phrases that need to be recognized during automatic message retrieval and key points at which commands should be issued. In a more sophisticated embodiment, a single program automatically handles script recording and refinement. For example, artificial intelligence in such a program (such as an understanding of the possible contexts) could dynamically identify the key points and key phrases during the script recording process and limit the script to just these elements. Furthermore, an even more advanced embodiment could train itself once the user has provided the phone number, mail box number and password.

Figures 2, 2A:
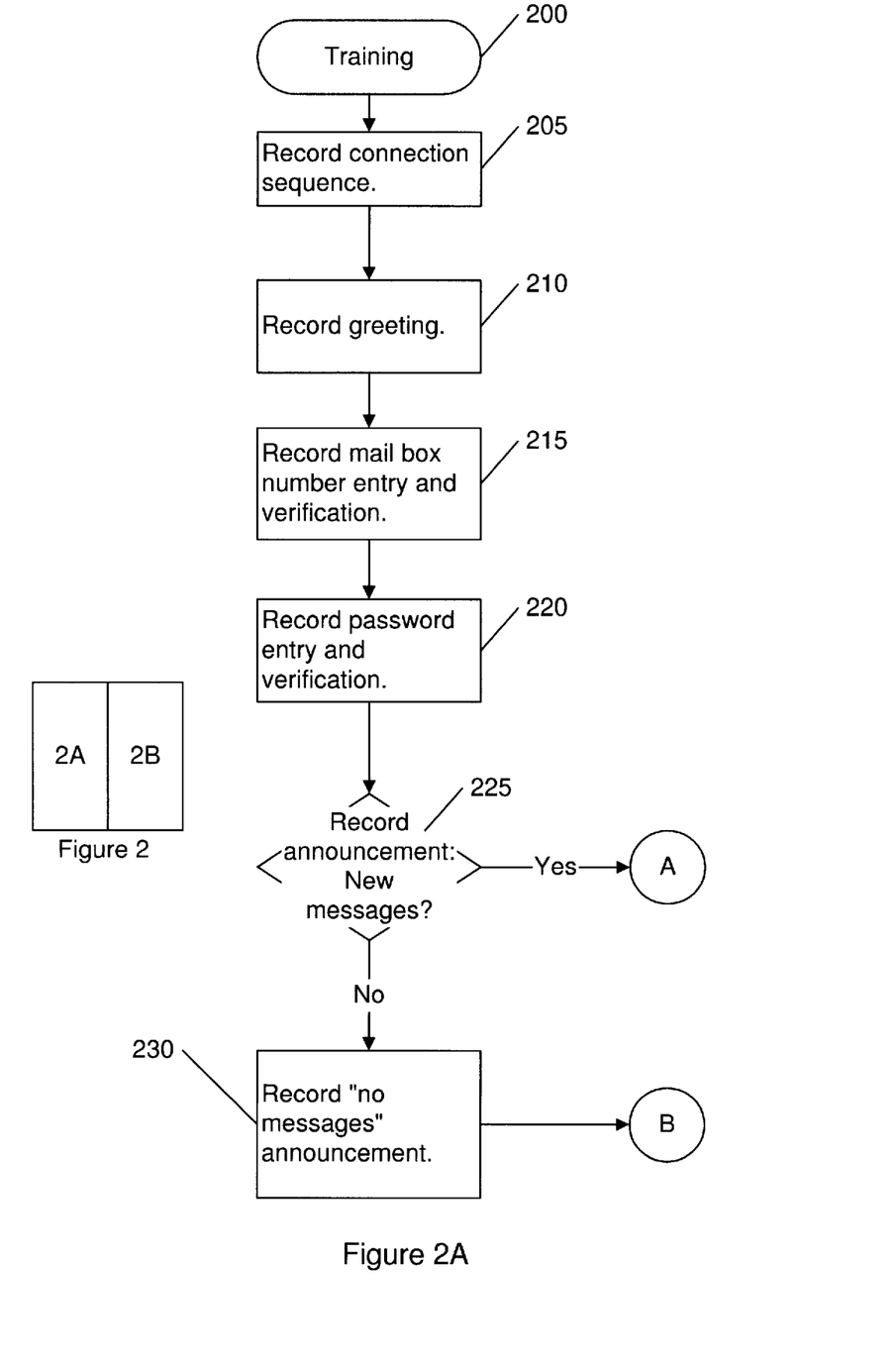
FIGS. 2A and 2B are flow chart of a training phase of the invention.
Figures 2, 2B:
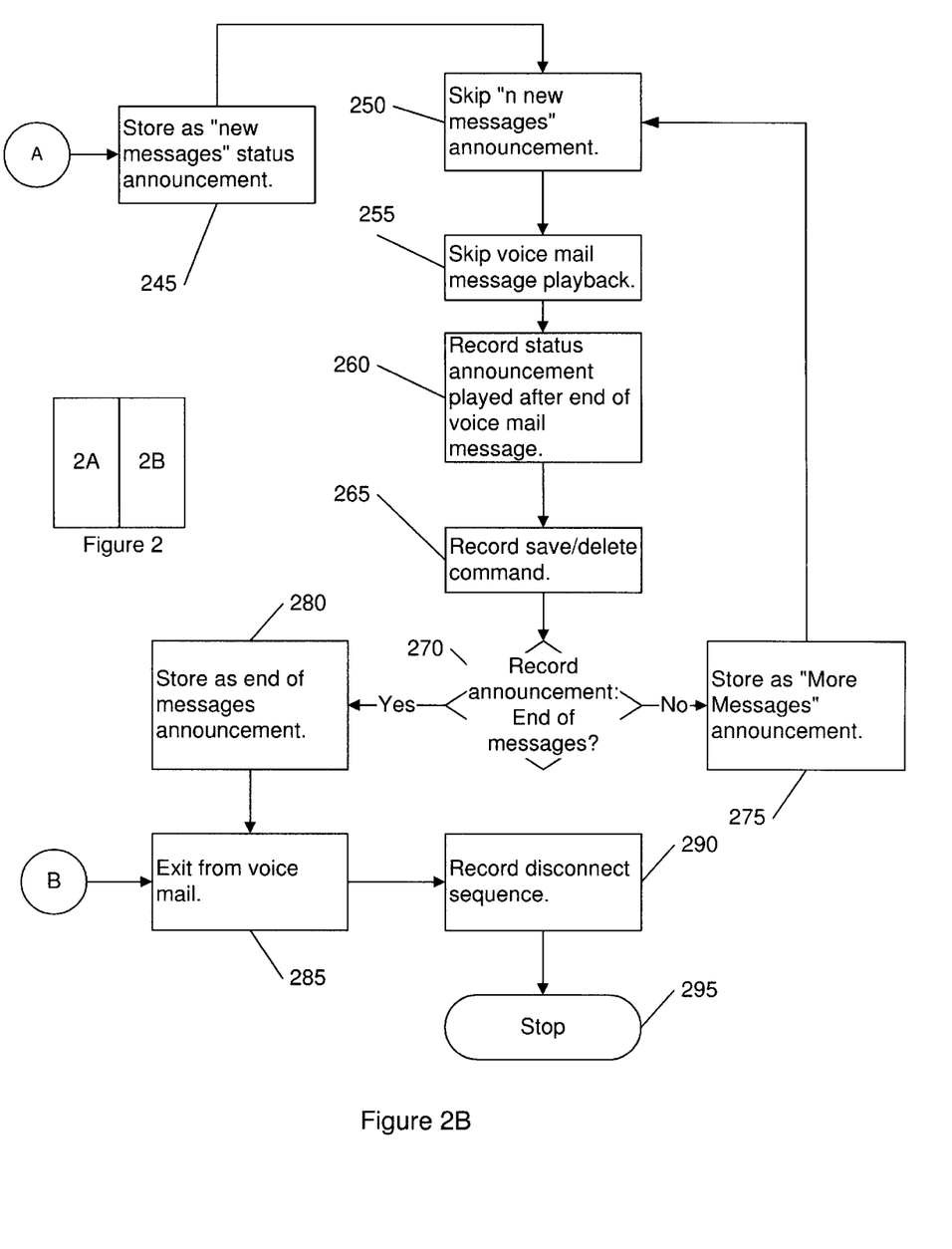

Referring now to FIG. 2, there is shown a flow chart of the training phase in conjunction with the devices described with respect to FIG. 1. In step 200, the user initiates the training session preferably by activating the capture program. The capture program preferably prompts for and records the voice mail system's telephone number, and then the capture program commands the portable computer's modem to dial the phone number and connect to the voice mail system (step 205). The capture program can recognize that a connection has been established using well known modem controls.

In the case of a poor connection or busy signal, the program preferably retries a number of times, after which it may either accept a poor connection (if this is the situation) or terminate its efforts to establish a connection. If a communications program is used as an intermediate, that program may handle the initial stages of dialing and connection. The user may also train the program of this invention to recognize the special circumstances of an overseas or foreign connection.

Once the connection has been established, the program records and stores a greeting announcement given by the voice mail system (step 210). The greeting announcement typically includes verbal instructions and may prompt the user to enter his mailbox number. In order to simplify this example, it is assumed that at each step the voice mail system makes an appropriate announcement and the capture program records it. Hence, at this step the user responds by entering his mailbox number into the portable computer 120 which the program records (step 215).

Figure 4:
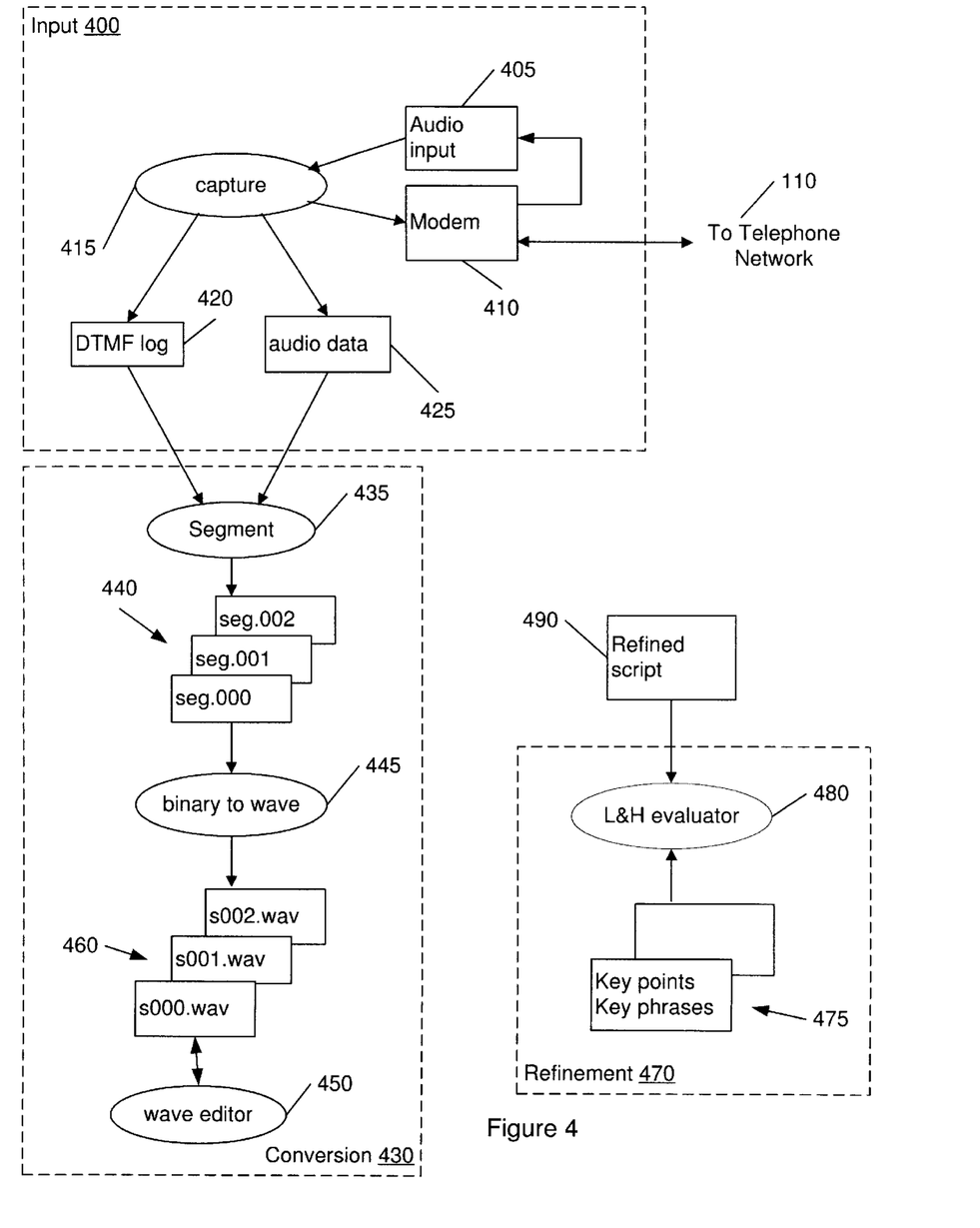
FIG. 4 is a data flow diagram of the training phase of the invention.

Referring for a moment to FIG. 4, the data flows for recording are described. The capture program 415 issues dialing instructions to the modem 410. The modem 410 generates DTMF tones and acts as audio interface to the telephone network 110. After connection to the voice mail system, the capture program 415 preferably instructs the modem to switch to voice mode. Accordingly, the modem 410 provides the telephone signals to an audio input device 405. The audio input device 405 converts the telephone signals into a form recognizable by the capture program 415 known as "samples." Other samples are generated by the user, such as DTMF key responses and verbal responses. The capture program 415 collects the DTMF key responses into a DTMF log 420 and the other samples into an audio data file 425. The DTMF log 420 and the audio data file 425 are preferably stored in the portable computer's memory.

Preferably, the capture program includes linkage information from the DTMF key responses stored in the DTMF log 420 to the corresponding announcement stored in the audio data file 425. Preferably, the capture program 415 stores the audio samples as compressed binary data.

With reference once again to FIG. 2, the voice mail system may also require verification at this point, such as reentering the mailbox number. Alternatively, the voice mail system may perform verification by comparing the transmitted mailbox number with a table of authorized mailbox numbers, and if it finds a match, noting this and announcing which mailbox number is the subject of the access request. Verification may also be carried out by recognition of the user's voice. In such a case, the portable computer 120 preferably includes a microphone through which the user can verbally relay the password to the voice mail system.

Most voice mail systems require password entry. The capture program records the announcement and password entry and, if applicable, verification of the password associated with the given mailbox (step 220). Verification may be by the user entering the password a second time for comparison with the first entry. The user can be considered to have 'entered' the mailbox at the end of step 220, when the voice mail system recognizes the correct password.

Typically, a voice mail system informs a user either that there are or are not new messages. "New messages" are messages that have not yet been played back by the PBX 140 (normally to the user). During the training phase of the method, there must be new messages. Thus, in step 225 such an announcement is recognized and processing proceeds to step 245. In step 245, the program stores the new message announcement for recognition as a 'message awaiting' status announcement.

Next, in step 250, the voice mail system makes an announcement of the number of messages in the mail box. When working with typical voice mail systems, such an announcement need not be stored. However, preferably, the capture program can be configured to record the announcement of the number of new messages. In this way, if the voice mail system requires the user to keep track of the total messages, the script can include adequate loop instructions to handle this.

The user then commands the voice mail system to play back the messages in the user's mailbox. In step 255, the capture program ignores playback of the message, since messages are not needed in the script. Next, the capture program records the status announcement given by the voice mail system after completion of playback of the message (step 260). Then, the capture program records the save or delete command from the user to, respectively, save or delete the played message (step 265).

In step 270, the capture program records an announcement that the voice mail system has either played all messages or that there are additional new messages. If the voice mail system has not played all the messages (more messages await) then in step 275 the capture program stores this announcement and the user's response. Preferably, the user causes the voice mail system to play any remaining messages as described above, starting from step 250.

If, on the other hand, the announcement indicated that there are no more messages, then the capture program stores this announcement (step 280). In step 285, the program records the actions of the user and the voice mail system's responses as the user exits from the voice mail system. Finally, the capture program records the portable computer's disconnect sequence (step 290), and script recording is complete (step 295).

At step 225, the voice mail system could have announced that there were no new messages. Preferably, the capture program records such an announcement (step 230) to allow for better control during the message retrieval phase. To accomplish this, it might be necessary to perform two training sessions and merge them. After the announcement is recorded, the capture program proceeds to step 285 to exit from the voice mail system as described above.

Referring again to FIG. 4, after script recording is complete, a segment program 435 combines the DTMF log file 420 and the audio data file 425, and splits the recorded information into a number of segments 440, each corresponding to a single step used in navigating the voice mail system. Preferably, the segment program also pre-processes selected segments. Examples of pre-processing include dc-offset removal using a filter and conversion to monophonic file format. The dc-offset filter is used to handle an observed problem of zero-offset in the sampled recordings.

Next, a binary to wave program 445 converts all of the segments to wave format files 460, preferably storing the wave files in the memory of the portable computer 120. Once in wave format, the segments can be viewed, edited, etc. by a wave file editor 450, such as WaveEdit and SoundRecorder.

The now-edited wave files 460 can be evaluated by an evaluator program 480 in conjunction with information provided by the user about key points and key phrases 475. The evaluator program may be, for example, the Lernout & Houspie automatic speech recognition (ASR) evaluator. The evaluator program 480 is used to develop the necessary contexts, preferably testing them against recordings from several voice mail access sessions. The results is a refined script 490 which is preferably stored in the memory of the portable computer 120. The evaluator program preferably can display the script on the display of the portable computer 120, and the evaluator program 480 and the wave editor 450 preferably can output the wave files 460 via an audio output system in the portable computer 120.

In general, speech recognition is greatly simplified when a user can train the system to a specific voice by repeatedly speaking the same phrases into a microphone or other instrument for computer capture. However, such an option is not expected to be available in this application because the user will lack first hand access to the speaker whose voice is used to generate announcements on the various voice mail systems. Generally speaking the only utterances that the user can access for inputting to this system are pre-recorded announcements that may, as in this example, be voice mail prompts, or, if training is being done with respect to an answering machine, answering machine announcements.

While a limited form of speaker adaptation is possible by training the recognition model on many repetitions of the pre-recorded announcements, using a speaker adaptable recognition engine such as L&H ASR-1500, the level of recognition is inferior.

Thus, options such as speaker adaptation are unavailable or provide less than optimal results, since the speaker is not present to be able to recite pre-determined phrases into the program. Additionally, some deterioration in the quality of speech may exist, first because the announcements are playbacks of a recording and second because announcements are transmitted over communication lines.

During both the training phase and the automatic message retrieval phase, the system of this invention preferably accepts and interprets announcements in real time. One way to reduce processing time is to recognize critical speech units based upon spotting of key words and/or phrases within the otherwise continuous stream or flow of audio information. Other means of recognition as are known in the art may, of course, also be used. Using word spotting, the user can train the system of this invention to deal which such unexpected announcements.

Even after the script has been refined, the user is preferably permitted to edit the script to increase its flexibility and/or usefulness. For example, a script for retrieving messages from a given mail box of a voice mail system could also be used for retrieving messages from another mail box on the same voice mail system simply by changing the mail box number and password stored in the script. Similarly, if a user needs to use a alter the phone number than that recorded in the script such as to add international access codes, the user may edit the script to effect this change without having to go through the training process again.

The Message Retrieval Phase of the Method of the Invention

Figure 3:
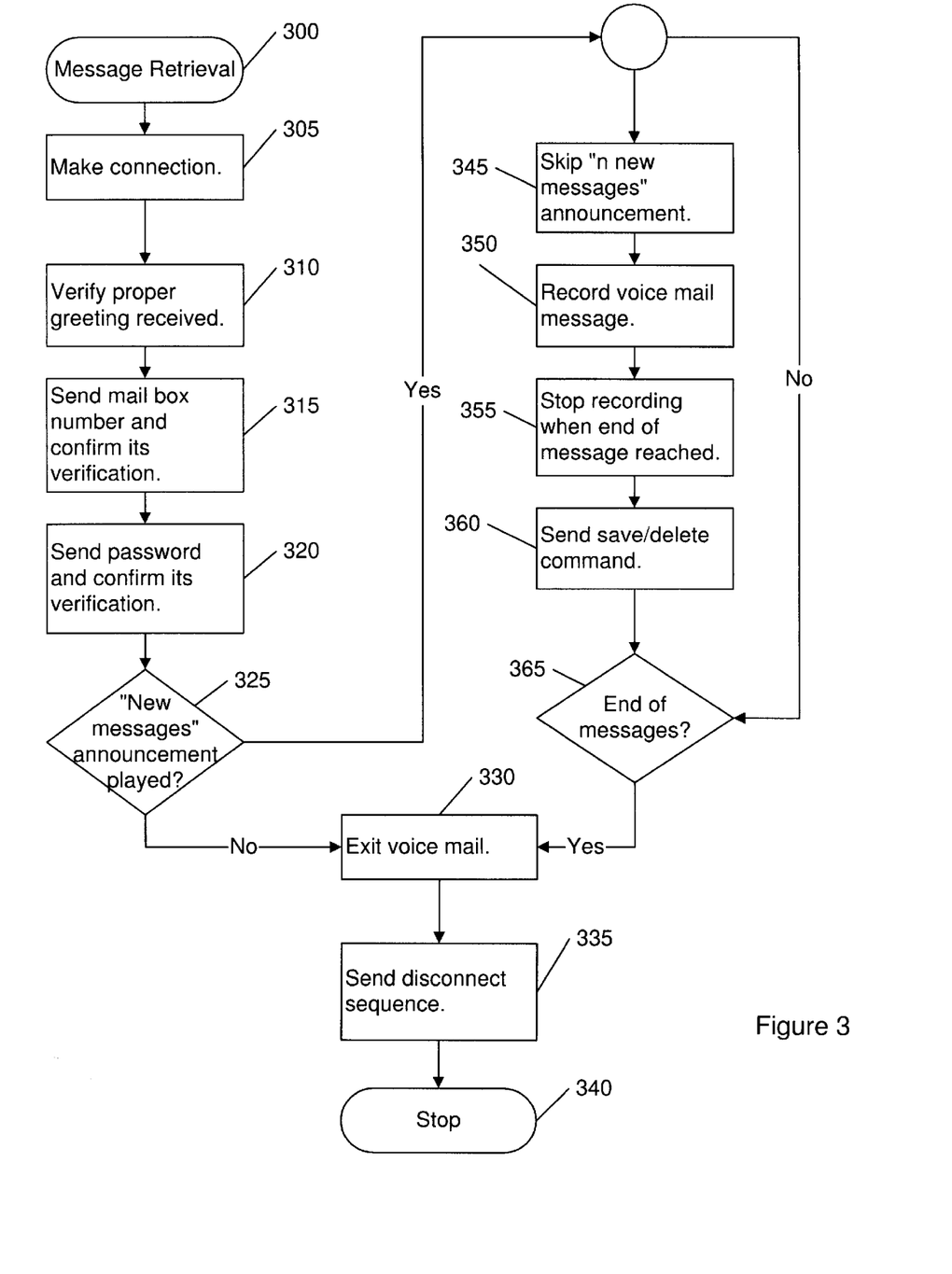
FIG. 3 is a flow chart of the message retrieval phase of the invention.

Referring now to FIG. 3, there is shown a flow chart of the automatic message retrieval phase of the method of the invention. In step 300, the user initiates a retrieval program. The retrieval program preferably operates without further user interaction, and preferably includes a timer so as to periodically perform automatic message retrieval from one or more voice mail systems.

Preferably the retrieval program can access a subset of the available voice mail systems or access voice mail systems in a different order on occasion. The user, then, optionally may select manually from a group of stored scripts presented on a menu, direct which scripts may be used and their order. The retrieval program may also, when running a number of scripts automatically terminate a script's execution, passing on to establishing a connection with the next voice mail system, in the case of failure of a session due to an error condition. Preferably, the retrieval program alerts the user as errors so that the user can discriminate between a 'no message' situation and a 'failure' situation.

To automatically retrieve messages, the retrieval program causes the modem to dial the access number for a given voice mail system and awaits a connection (step 305), redialing if necessary. The modem can also function to monitor call progress and switch into voice mode at the appropriate point in the process. The retrieval program then verifies that a proper greeting announcement by comparison with the announcement stored in step 210 of the training process (step 310). The retrieval program preferably accomplishes this by matching certain key words or key phrases that are applicable to the appropriate context.

In addition to the expected announcements which are received at various context points and processed and stored for comparison, the retrieval program may also encounter unexpected announcements. These announcements may come at any time, but are most likely to occur during the initial greeting period (step 310) where the voice mail system is most likely to provide announcements of general interest. Preferably, the retrieval program is sufficiently robust to adequately handle such a situation.

One simple resolution is to simply exit from the voice mail system (step 330) and disconnect (step 335). More preferably, however, the retrieval program attempts to continue past the unexpected announcement. For example, the unexpected announcement could be ignored. Alternatively, the retrieval program could repeat the step in which the unexpected announcement was received. To alert the user, the retrieval program preferably records the unexpected announcement.

Following step 310, the retrieval program uses the audio output device (generally via DTMF) to relay the appropriate mailbox number to the voice mail system and, if applicable, confirm that this number has been verified (step 315). In step 320, the retrieval program sends the password for the voice mailbox and, if appropriate, confirms that it has been verified.

Now the first decisional step is reached (step 325). Here, the retrieval program analyzes the announcement relayed by the voice mail system to determine whether or not this is a 'new messages' announcement. If it is not, the retrieval program proceeds to step 330 wherein it exits from the voice mail system.

If the retrieval program instead determines that the voice mail system issued the 'new message' announcement, then the retrieval program proceeds to step 345 where it skips the 'no new messages' announcement (or 'next message' announcement as discussed with reference to FIG. 2). The retrieval program controls the receipt and transfer of the message from the voice mail system to the memory of the portable computer (step 350). The retrieval program preferably converts the message from analog to digital via an analog-to-digital converter prior to storage. The retrieval program may, at this time, output an audible or visible indication of the fact that it is recording or has recorded a message.

The retrieval program ceases recording when it reaches and recognizes (usually by a tone or by extended silence), the end of the message (step 355). The program then sends either a save or a delete message command (such as via DTMF) to the voice mail system as per the script (step 360). The retrieval program then determines whether the last new message has been played (step 365). If not, the program returns to step 345 to skip the 'next message' announcement. Otherwise, no other new messages exist and the retrieval program transfers to the first step of the exit sequence.

The exit sequence, which begins with step 330, continues with step 335 where the retrieval program sends the disconnect sequence in order to disconnect the portable computer 120 from the telephone line connection 110. The retrieval program thereafter terminates in step 340.

Preferably, the retrieval program outputs a status indicator in the form of an audible or visible signal to indicate that a message has been recorded. It is also desirable that the user may screen calls as the portable computer 120 retrieves and records them. When the user instructs the retrieval program to play back the recorded messages, the retrieval program converts the recorded messages from digital form to analog audio.

Preferably, the retrieval program includes a number of controls to enhance the user's ability to play back messages recorded in the portable computer 120. For example, a scan mode can be used to in conjunction with sequential access of the messages, allowing the user to process them at a faster rate than they were input. The user to may also benefit from being able to temporally position within a message set or within a message by, for example, moving a scroll bar within the message screen. In addition to being able to choose which message or which part of a message to play back, the user preferably can control the speed of the message playback, playing it at either a faster or slower speed than that at which it was originally recorded. Also, digitally recorded messages can be compressed to increase the portable computer's capacity for storing messages. The retrieval program may use an algorithm, such as FIFO, to delete excess stored messages.

Another desirable feature is to allow the user, after playback of a recorded message, to record a verbal response. This response would be transmitted to the sender of the message at a still later time, when the portable computer 120 is once again connected to a phone system.

EXAMPLE

The system of this invention was trained and tested on a voice mail system produced by Octel Communications Corporation, and in use at Toshiba America Information Systems, Inc. (Irvine, Calif.). Table 1 below shows the five contexts which the user developed in order to interact with this system. The user used five contexts because it appeared that certain of the key words could be confused during operation if only a single context were used. These five contexts apply to most current voice mail systems which proceed through a similar logical path in the process of message retrieval.

TABLE 1

| Context | Keyword/Key Phrase | Stage |
| --- | --- | --- |
| Entry | mail box number | Mail box # response. |
|  | password | Password response. |
| Decision | no new messages | Take exit path. |
|  | <>[1] | New message path. |
| Retrieve | 11[2] | Playback response starts recording. |
| Message End | end of message | Stop message recording. |
|  | to erase. | Delete message in mail box response. |
| Exit | main menu | No more messages to record. |
|  | start | Exit and place phone on hook. |

[1]In the system used for training there was no audible announcement at this point in time.
[2]In the system used for training the announcement tells the user to enter 11 to retrieve messages.

The five contexts each correspond to one or more steps in the flow chart of FIG. 2. During script refinement, the program submitted captured audio segments corresponding to the appropriate keyword column entry to the recognition engine for identification, with the appropriate context active. The user then adjusted several of the recognition parameters, iteratively, and tested the result with all five contexts and files from different recording sessions in order to assure that tuning the recognition engine for one key word or key phrase did not prevent the recognition of others. Amplifying the signal did not improve the recognition result since the signal to noise ratio remained constant. However, using a low-pass filter minimized the effect of certain noises such as popping sounds that were occasionally noticed.

In addition to the five contexts tested, developing an additional context involving a key phrase that would normally be encountered upon connection to the voice mail system, allowed recognition of this key phrase to determine acceptable line quality for the connection. Additional contexts enabled the system of the invention to handle rare, but generally predicted announcements (unexpected announcements).

OTHER APPLICATIONS

The method of this invention could function in numerous other applications wherein there is remote (e.g. telephonic) access to an automated system which produces verbal announcements, and where the communications with such remote system is of a predictable and, generally, repetitive nature. Thus, it is also possible to produce scripts for accessing bank account information, stock market information, investment portfolio information, etc. from appropriate automated systems.

Each of these automated systems presents its own problems which can be handled by the system of this invention. For example, when accessing a home answering machine it is possible that someone will be in the region of the answering machine and will pick up the phone. This situation could be detected and handled, for example, by alerting the user, by issuing a pre-recorded message asking the person picking up the phone to leave a message, or by asking that person to output a DTMF message which will tell the portable computer 120 whether or not to redial. In certain circumstances, such as accessing information of a confidential nature, or where access to a given system could, if certain manipulations were performed, have financial consequences, passwords or other forms of security are built into the system in order to prevent unauthorized users from gaining access or information whose dissemination should be restricted.

In all these cases there is total independence of this system from the host system being accessed. That is, the accessed system is not 'aware' that it is in contact with a remote computer system rather than a live user. Thus, the method of this invention does not require any cooperation from the host system in order to operate. The portable computer plays its script and the host system believes that it is interacting with a live user.

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications and alterations should therefore be seen as within the scope of the present invention.

I claim:

1. A computer device for accessing and processing at least one audio message from a first remote message facility accessible via telephone, where the first remote message facility provides verbal announcements, the computer device comprising:

a processor;

a memory coupled to the processor for storing a program, verbal announcement audio signals, and input message signals;

a telephone interface coupled to the processor for selectively and temporarily interconnecting the computer device with a telephone network;

an audio input subsystem coupled to the processor for accepting the verbal announcement audio signals and the input message signals;

an audio output subsystem coupled to the processor for outputting stored input message signals; and a signal producing device for producing signals recognizable by the first remote message facility;

wherein the program comprises:

a verbal announcement accepting function for accepting verbal announcements from the first remote message facility, a verbal announcement recording function for recording verbal announcements from the first remote message facility, a verbal announcement discriminating function for discriminating between different verbal announcements from the first remote message facility, and a response function for responding to verbal announcements from the first remote message facility.

2. A computer device for accessing and processing audio messages stored at a first remote message facility accessible via telephone according to claim 1 wherein the computer device is a portable computer and the processor is a microprocessor.

3. A portable computer device for accessing and processing audio messages stored at a first remote message facility accessible via telephone as set forth in claim 2 wherein the input message signals are audible speech signals.

4. A portable computer device for accessing and processing audio messages stored at a first remote message facility accessible via telephone as set forth in claim 3 further including an analog-to-digital converter coupled to the telephone interface for converting audible speech messages transferred from the first remote message facility into digital data format prior to storage within the memory.

5. A portable computer device for accessing and processing audio messages stored at a first remote message facility accessible via telephone as set forth in claim 3 wherein the audio output subsystem further includes headphones for monitoring verbal announcement signals.

6. A portable computer device for accessing and processing audio messages stored at a first remote message facility accessible via telephone as set forth in claim 2 wherein the verbal announcement discriminating function further comprises a spotting function for spotting a word or phrase within a continuous flow of speech.

7. A portable computer device for processing messages stored at a first remote message facility accessible via telephone as set forth in claim 2 wherein the response function outputs speech signals.

8. A computer device as set forth in claim 1 wherein the computer device also functions to access and process at least one audio message from a second remote message facility, where the second remote message facility provides different verbal announcements from the first remote message facility.

9. A computer device as set forth in claim 8 wherein the computer device automatically accesses the second remote message facility upon recognizing an error condition affecting its access to the first remote message facility.

10. A portable computer device for accessing and processing audio messages stored at a first remote message facility accessible via telephone, where the first remote message facility provides verbal announcements, the portable computer device comprising:
- a microprocessor;
- memory coupled to the microprocessor for storing a program and audio signals;
- a telephone interface coupled to the microprocessor for selectively and temporarily interconnecting the portable computer device with a telephone network;
- a sound board coupled to the microprocessor for accepting audio signals;
- an audio output coupled to the microprocessor for outputting audible speech from stored audio signals; and
- a signal producing device for producing signals recognizable by the first remote message facility;
- wherein the program comprises:
  - a verbal announcement accepting function for accepting verbal announcements from the first remote message facility,
  - a verbal announcement recording function for recording verbal announcements from the first remote message facility,
  - a verbal announcement discriminating function for recognizing verbal announcements from the first remote message facility,
  - an output control function for allowing a user to control a message playback with respect to identity of message and speed of playback, and
  - a response function for responding to verbal announcements from the first remote message facility.

11. A portable computer device for accessing and processing audio messages stored at a first remote message facility accessible via telephone as set forth in claim 10 wherein the audio signals stored within the memory are stored in digital data format and wherein the audio output includes digital data-to-speech conversion means coupled to the microprocessor for creating speech signals corresponding to digital data.

12. A portable computer device for processing messages stored at a first remote message facility accessible via telephone as set forth in claim 10 further including analog storage means and wherein a set of the audio signals are stored in analog data format.

13. A portable computer device for processing messages stored at a first remote message facility accessible via telephone as set forth in claim 10 further comprising an analog-to-digital converter coupled to the sound board for converting audio messages transferred from the first remote message facility into digital data format prior to storage within the memory.

14. A portable computer device for processing messages stored at a first remote message facility accessible via telephone as set forth in claim 10 further including a status indicator coupled to the microprocessor for visually indicating communication between the first remote message facility and the portable computer device.

15. A portable computer device for processing messages stored at a first remote message facility accessible via telephone as set forth in claim 10 wherein the response function outputs DTMF signals.

16. A portable computer device for processing messages stored at a first remote message facility accessible via telephone as set forth in claim 10 wherein the response function outputs speech signals.

17. A portable computer device as set forth in claim 10 wherein the portable computer device also functions to access and process at least one audio message from a second remote message facility, where the second remote message facility provides different verbal announcements from the first remote message facility.

18. A portable computer device as set forth in claim 17 wherein the portable computer device automatically accesses the second remote message facility upon recognizing an error condition affecting its access to the first remote message facility.

19. A computer device for accessing and processing audio messages stored at more than one remote message facility accessible via telephone, where each remote message facility provides verbal announcements, the computer device comprising:
- a processor;
- memory coupled to the processor for storing a program and audio signals;
- a telephone interface coupled to the processor for interconnecting the computer device with a telephone network;
- a sound board coupled to the processor for accepting audio signals;
- an audio output coupled to the processor for outputting audible speech from stored audio signals; and
- a signal producing device for producing signals recognizable by each remote message facility;
- wherein the program comprises:
  - a verbal announcement accepting function for accepting verbal announcements from each remote message facility,
  - a verbal announcement recording function for recording verbal announcements from each remote message facility,
  - a verbal announcement discriminating function for recognizing verbal announcements from each remote message facility, and
  - a response function for responding appropriately to verbal announcements from each remote message facility.

20. A computer device for accessing and processing audio messages stored at more than one remote message facility accessible via telephone, in accordance with claim 19, wherein the computer is a portable computer and the processor is a microprocessor.

21. A computer device for accessing and processing audio messages stored at more than one remote message facility accessible via telephone, in accordance with claim 20, wherein a first remote message facility is a voice mail facility and a second remote message facility is an answering machine.

22. A computer device for accessing and processing audio messages stored at more than one remote message facility accessible via telephone, in accordance with claim 20, wherein the stored program further comprises an output control function for allowing a user to control a message playback as to identity of message and speed of playback.

23. A computer device for accessing and processing at least one audio message from a first remote message facility accessible via telephone, where the first remote message facility provides verbal announcements, the computer device comprising:
   a processor;
   memory coupled to the processor for storing a program, verbal announcement audio signals, and input message signals;
   a telephone interface coupled to the microprocessor for selectively and temporarily interconnecting the computer device with a telephone network;
   a sound board coupled to the processor for accepting the verbal announcement audio signals and the input message signals;
   an audio output coupled to the processor for outputting stored input message signals; and
   a signal producing device for producing signals recognizable by the first remote message facility;
   wherein the stored program is for performing the steps of:
   (1) causing the computer device to connect via a telephone line, to the first remote message facility;
   (2) causing the computer device to accept a first voice greeting announcement from the first remote message facility to the computer device;
   (3) causing the computer device to compare the first voice greeting announcement with a second voice greeting announcement previously stored in the computer device;
   (4) causing the computer device to test if the first voice greeting announcement conforms with the second voice greeting announcement, and if so then:
      (a) causing the computer device to receive a first voice status announcement from the first remote message facility, wherein the first voice status announcement indicates that the first remote message facility has unread messages;
      (b) causing the computer device to compare the first voice status announcement with a second voice status announcement previously stored in the computer device;
      (c) causing the computer device to test if the first voice status announcement conforms with the second voice status announcement, and if so then
         (i) causing the computer device to accept from the first remote message facility first set of unread messages; and
         (ii) saving the first set of unread messages on the computer device.

24. A computer device for accessing and processing audio messages stored at a first remote message facility accessible via telephone as set forth in claim 23 wherein the stored program is for performing the further steps of:
   causing the computer device to accept a mailbox identification request announcement from the first remote audio message facility; and
   causing the computer device to transmit a mailbox identification number, previously stored in the computer device, from the computer device to the first remote message facility.

25. A computer device for accessing and processing audio messages stored at a first remote message facility accessible via telephone as set forth in claim 24 wherein the stored program is for performing the further steps of:
   causing the computer device to test if the first remote message facility indicates that the mailbox identification number matches the authorized mailbox number, then
   causing the computer device to transmit a first password, previously stored in the computer, from the computer to the first remote message facility.

26. A computer device for accessing and processing at least one audio message from a first remote message facility as set forth in claim 23, wherein the computer device also functions to access and process at least one audio message from a second remote message facility and the stored program is for performing the additional steps of:
   (4) causing the computer device to connect via the telephone line, to the second remote message facility;
   (5) causing the computer device to accept a third voice greeting announcement from the second remote message facility to the computer device;
   (6) causing the computer device to compare the third voice greeting announcement with a fourth voice greeting announcement previously stored in the computer device;
   (7) causing the computer device to test if the third voice greeting announcement conforms with the fourth voice greeting announcement, and if so then
      (a) causing the computer device to accept from the first remote message facility a second set of unread messages; and
      (b) causing the computer device to save the second set of unread messages.

27. A computer device for accessing and processing at least one audio message from a first remote message facility as set forth in claim 26, wherein the stored program is farther for performing the additional step of:
   (8) causing the computer device to determine if there is an error condition with respect to the first remote message facility and, if there is an error condition with respect to the first message facility, and if so then:
      (a) causing the computer device to disconnect from the first remote message facility, and
      (b) causing the computer device to proceed to establish a connection with the second remote message facility.

28. A method of retrieving messages from a remote audio message facility where the remote audio message facility provides verbal announcements, comprising the steps of:
   (1) connecting a computer via a telephone to the remote message facility;
   (2) accepting a first voice greeting announcement, previously stored in the remote message facility, from the remote message facility to the computer;
   (3) comparing in the computer the first greeting announcement with a second voice greeting announcement previously stored in the computer;

(4) if the first greeting announcement conforms with the second greeting announcement, then:
   (a) transmitting a first password, previously stored in the computer, from the computer to the remote message facility;
   (b) comparing in the remote message facility the first password with a second password previously stored in the remote message facility;
   (c) if the first password matches the second password, then
      (i) receiving a first voice status announcement in the computer from the remote message facility, wherein the first voice status announcement indicates that the remote message facility has unread messages;
      (ii) comparing in the computer the first voice status announcement with a second voice status announcement previously stored in the computer;
      (iii) if the first voice status announcement conforms with the second voice status announcement, then accepting transfer, from the remote message facility to the computer, of the unread messages.

29. A method of retrieving messages from a remote message facility as set forth in claim 28, wherein the step of accepting transfer from the remote message facility to the computer of the unread messages comprises the steps of:
   (1) transmitting an unread message from the remote message facility to the computer;
   (2) identifying in the computer the end of transmission of the unread message;
   (3) transmitting a third voice status announcement, previously stored in the remote message facility, from the remote message facility to the computer;
   (4) comparing in the computer the third voice status announcement with a fourth voice status announcement previously stored in the personal computer, the fourth voice status announcement indicative that the remote message facility has additional unread messages;
   (5) if the third voice status announcement conforms with the fourth voice status announcement, then returning to said step of transmitting an unread message above.

30. A method of retrieving messages from a remote message facility as set forth in claim 28, wherein the step of accepting transfer from the remote message facility to the computer of the unread messages comprises the steps of:
   (1) transmitting an unread message from the remote message facility to the computer;
   (2) identifying in the computer the end of transmission of the unread message;
   (3) transmitting a current DTMF signal, previously stored in the remote message facility, from the remote message facility to the computer;
   (4) comparing in the computer the current DTMF signal with a previously stored DTMF signal in the personal computer, the stored DTMF signal indicative that the remote message facility has additional unread messages;
   (5) if the current DTMF signal conforms with the stored DTMF signal, then returning to said step of transmitting an unread message above.

31. A method of retrieving at least one audio message from a remote audio message facility accessible via telephone, where the remote message facility provides verbal announcements, the method comprising the steps of:
   (1) connecting a computer containing the computer program, via a telephone line, to the remote message facility;
   (2) accepting a first voice greeting announcement from the remote message facility to the computer;
   (3) comparing in the computer the first voice greeting announcement with a second voice greeting announcement previously stored in the computer;
   if the first voice greeting announcement conforms with the second voice greeting announcement, then:
      (a) receiving a first voice status announcement by the computer from the remote message facility, wherein the first voice status announcement indicates that the remote message facility has unread messages;
      (b) comparing in the computer the first voice status announcement with a second voice status announcement previously stored in the computer;
      if the first voice status announcement conforms with the second voice status announcement, then
         (i) accepting from the remote message facility to the computer unread messages; and
         (ii) saving the unread messages on the computer.

32. A computer device for processing verbal communications obtained from interaction with a first remote facility accessible via telephone, the computer device comprising:
   a processor means;
   a data input means for interacting with the processor means;
   a display means for providing output to a user;
   a communication input means for sampling verbal communications from the first remote facility;
   a memory means coupled to the processor means for storing a plurality of messages;
   a telephone interface means coupled to the processor for interconnecting the computer device with a telephone network;
   communications means coupled to the processor means for transferring at least one audio input from the first remote message facility to the memory in response to establishing communication between the first remote message facility and the computer device;
   first comparison means for comparing a first announcement received from the first remote message facility with a second announcement received from the first remote message facility and stored in the memory to determine if the first announcement matches the second announcement; and
   first control means for actuating receipt and transfer of an audio message from the first remote facility to the memory when the first announcement matches the second announcement.

33. A computer device for processing verbal communications obtained from interaction with a first remote facility accessible via telephone as set forth in claim 32 which further includes audio output means for creating audible speech from an audio message stored in the computer memory.

34. A computer device for processing verbal communications obtained from interaction with a first remote facility accessible via telephone as set forth in claim 33 further including an analog-to-digital converter coupled to the communications means for converting audio messages transferred from the first remote facility into digital data format prior to storage within the memory means.

35. A computer device for processing verbal communications obtained from interaction with a first remote facility accessible via telephone as set forth in claim 34 wherein the first remote facility is a voice mail facility containing stored audio messages.

36. A computer device for processing verbal communications obtained from interaction with a first remote facility accessible via telephone as set forth in claim 32 and also for processing verbal communications from interaction with a second remote facility accessible via telephone, further comprising:

second comparison means for comparing a third announcement received from the second remote message facility with a fourth announcement received from the second remote message facility and stored in the memory to determine if the third announcement matches the fourth announcement; and     second control means for actuating receipt and transfer of an audio message from the second remote facility to the memory when the third announcement matches the fourth announcement.

37. A computer device for processing verbal communications obtained from interaction with a first remote facility and a second remote facility, each accessible via telephone as set forth in claim 36, further comprising:

recognition means for recognizing an error condition with respect to the first remote facility; and     error handling means for terminating connection with the first remote facility and instituting connection with the second remote facility in the event of an error condition with respect to the first remote facility.

38. A computer device for processing verbal communications obtained from interaction with a first remote facility accessible via telephone as set forth in claim 37 wherein the first remote facility is a voice mail facility capable of containing stored audio messages and the second remote facility is an answering machine.

39. A method of training a computer to provide automatic communications with a remote message facility where the remote message facility provides verbal announcements for use by people to navigate features provided by the remote message facility the method comprising the steps of:

(1) running an access program on the computer;

(2) connecting the computer running the access program to the remote message facility; and     (3) navigating a verbal communication accessing session generated by the remote message facility by:

(a) the computer capturing at least one verbal announcement from the remote message facility,         (b) the computer analyzing and reproducing the verbal announcement from the remote message facility for the user to hear, the verbal announcement including a key phrase,         (c) the computer storing an identifiable portion of the key phrase of the verbal announcement,         (d) the computer receiving input from the user and transmitting the input to the remote message facility, and         (e) the computer capturing the user input.

40. A method of training a computer to provide automatic communications with a remote message facility as set forth in claim 39 wherein the remote facility is a voice mail facility.

41. A method of training a computer to provide automatic communications with a remote message facility as set forth in claim 39 wherein the remote facility is an answering machine.

42. A method of training a computer to provide automatic communications with a remote message facility as set forth in claim 39 wherein the user input is in the form of DTMF.

43. A method of training a computer to provide automatic communications with a remote message facility as set forth in claim 39 wherein the user input is verbal.

44. A method of training a computer to provide automatic communications with a remote message facility as set forth in claim 39 where the communications from the remote facility are captured as wave records linked to corresponding user input.

45. A method of training a computer to provide automatic verbal communications with a remote message facility where the remote message facility provides verbal announcements comprising the steps of:

(1) running an access program on a personal computer:

(2) connecting the computer running the access program to the remote message facility;

(3) setting up a user interface to allow interaction of a user with the remote facility;

(4) navigating a verbal communication accessing session with respect to the remote facility by:

(a) allowing the user to perceive communications from the remote facility,         (b) allowing the user to transmit input to the remote facility,         (c) capturing the communications from the remote facility, and         (d) capturing the user input; and     (5) processing the communications from the remote facility to produce recognition contexts,     where the communications from the remote facility are captured as wave records     linked to corresponding user input; and     where the step of processing the communications from the remote facility further comprises the steps of:

(a) converting the wave records to wave format files;

(b) pre-processing the wave format files;

(c) editing the pre-processed wave format files with a utility program; and         (d) evaluating the edited wave format files with an automatic speech recognition evaluator.

46. A computer device as set forth in claim 1 wherein the computer device also functions to access and process at least one audio message from a second remote message facility, where the second remote message facility is an answering machine.

* * * * *